June 22, 1943.　　　G. E. KING ET AL　　　2,322,637
VARIABLE VOLTAGE PLANER CONTROL
Filed March 4, 1942　　　2 Sheets-Sheet 2

INVENTORS
George E. King and
William H. Formhals.
BY
Paul E. Friedemann
ATTORNEY Patented June 22, 1943

2,322,637

UNITED STATES PATENT OFFICE 2,322,637

VARIABLE VOLTAGE PLANER CONTROL

George E. King, Wilkinsburg, and William H. Formhals, Forest Hills, Pa., assignors to Westinghouse Electric & Manufacturing Company, East Pittsburgh, Pa., a corporation of Pennsylvania Application March 4, 1942, Serial No. 433,350

6 Claims. (Cl. 172—240)

Our invention relates to the control systems for electric motor and more particularly to control systems embodying automatic operation of motors used to drive reciprocating mechanisms such as planers, draw-cut and push-cut shapers, roll grinders, transfer tables, etc., by variable voltage control.

The speed of operation of a planer platen driven by an electric motor using a conventional variable-voltage control system is limited, in part, by the time of reversal required by the platen motor consistent with good commutation.

As the time constants of the generator fields are decreased, both the rate of deceleration and the rate of acceleration are increased but the braking peak current increases rapidly to a point where severe sparking between the brushes and the commutator of the generator armature occurs. This braking current, as the motor drops in speed, drops rapidly and the decelerating rate correspondingly decreases. Since bringing the platen motor to rest requires that it give up its stored energy, the time of deceleration is decreased if the average braking current is increased. Also, with faster generator fields the time of acceleration is decreased. To accomplish faster reversing time for the driving motor we propose to provide means to change the time constant of the generator fields during the reversing cycle. At the start of the reversing cycle, i. e., the braking period, the fields are just fast enough to limit the reversal current to a satisfactory commutating value. When this current decreases, the time constant of the fields is decreased, by means hereinafter disclosed, thus giving another current peak of braking if the motor has not come to rest, or an increased acceleration if the motor has reversed.

With our scheme damping, or short circuited, windings are used with a generator field to slow down the rate of change of the flux and so limit the current peaks which occur with a decay of flux. We further provide means to control the amount of damping effect and the time during the reversing cycle it is used.

A broad object of our invention is to provide, in a control system for controlling a tool operating machine motor, for the reversal of the machine motor, from full selected speed in one direction to full selected speed in the opposite direction, in as small a portion as possible of the total time required to complete one operation cycle.

Another object of our invention is to provide for a quick yet smooth reversal of the driving motor of a tool operating machine so as to eliminate any undue strain on the gears of the machine.

A further object of our invention is to provide, in a control system of a tool operating machine, for changing the time constants of the generator fields in such a way as to afford rapid reversal of the driving motor and at the same time maintain a value of braking current that can be safely commutated by the generator.

Other objects and advantages not specifically hereinbefore recited will become more apparent from a study of the following specification when considered in conjunction with the accompanying drawings in which.

Figure 1:
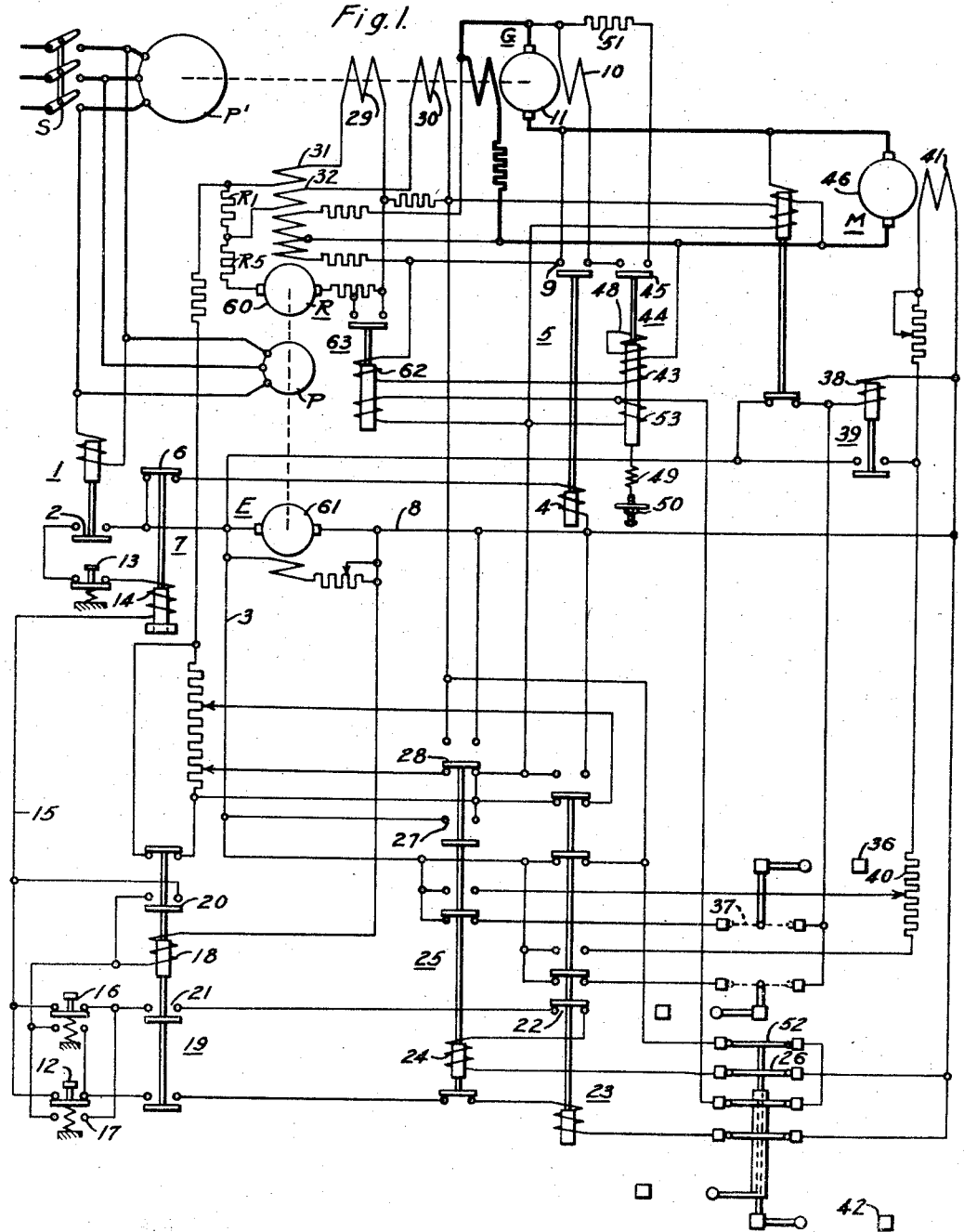
Figure 1 is a diagrammatic representation of a complete system of control for a reversing motor operating a planer platen or other tool actuating machine.
Figure 2:
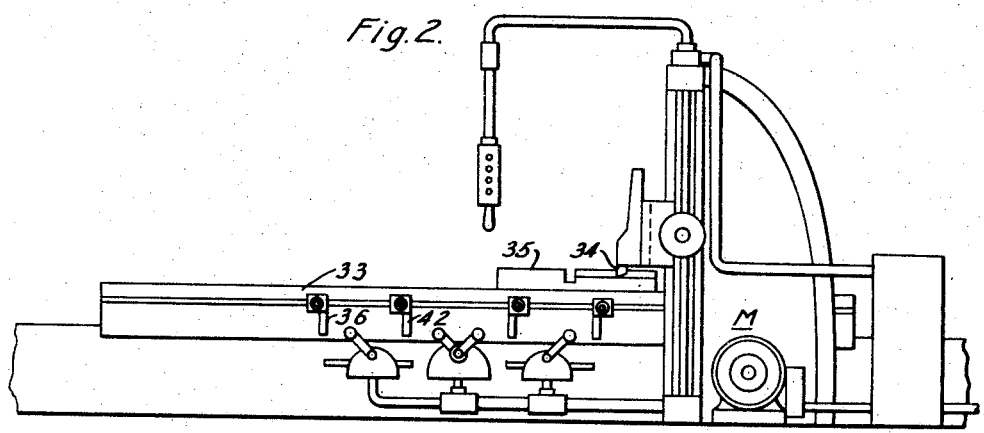
Figure 2 is a side view, somewhat diagrammatic, of a planer having a tool support and a motor for operating the platen.

In the practice of our invention we provide a variable-voltage control-system in which the motor M is mehanically coupled to drive a machine tool as the planer platen 33. The motor M is provided with a separately excited field 41 which is arranged to be excited in a single direction only. A generator G is provided having its armature connected in series with the armature 46 of the motor M. The generator G is provided with field windings 29 and 30 which are connected in series with the field windings 31 and 32, respectively of a regulator-generator R. The generator fields 29 and 30, the regulator-generator field 31 and 32 and the armature 60 of the regulator generator are connected in a Wheatstone bridge circuit. The exciter E is used to supply a constant potential source for the generator fields and the control in general.

The armatures 60 and 61 are mechanically connected to a prime mover P which is shown as a 3-phase motor controlled from a conventional motor starter S. When the controller S is operated a low-voltage relay 1 is energized and its contact members 2 close thus energizing the conductor 15 which supplies energy to the control system.

Included in the control system is a double coil time delay relay 44. The coil 53 of this relay is a constant potential coil connected between the reversing switch contacts that control the generator field reversing circuit. The coil 43 is subject to a variable potential and is connected in series with coil 52 of the relay 53 both being connected across the armature 11 of the generator G. The armature 48 of the relay 44 is biased by a spring 49, the tension of which can be adjusted by screw 50. The coils 43 and 53 are additive and the relay 44 has its contact member 45 close throughout all but a small portion of the operation cycle of the machine tool. The generator residual-killing, or differential field 10 thus is in series circuit relation with the adjustable resistor 51 during most of the operating cycle. It is during the reversal of the motor M that the relay 44 becomes deenergized.

Figure 3:
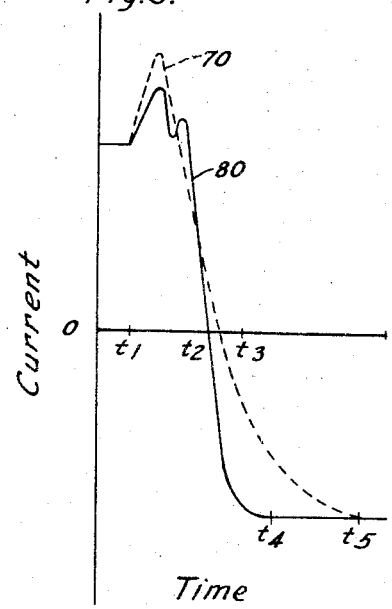
Fig. 3 shows curves revealing the difference in reversing time of a motor using a conventional control system (shown dotted) and a control system incorporating our invention.

When the planer platen 33 reaches the end of a stroke, reversing limit switches are operated which deenergize the coil 53 but the contact member 45 does not yet open since the coil 43 is designed to be strong enough to hold the armature 48 up until such a time as the potential across the armature 11 of the generator G drops to a predetermined value. At this value of potential the braking peak current will have diminished to a value such that removal of the damping effect from the generator differential field i. e., changing the time constant of the generator fields will not cause poor commutation. Upon removal of the damping effect the braking current will increase slightly to give a further decrease in the deceleration time. The value of the braking peak current at this time, however, is within safe limits for good commutation. The relay 44 remains deenergized during a small portion of the accelerating cycle and thus the initial accelerating rate will be increased. Therefore, by selecting the proper electrical values for the resistor 51 and coil 10 the shortest possible reversing time is achieved. Referring to Fig. 3, the dotted curve 70 shows the result from using conventional generator fields without our invention, and the solid curve 80 shows the results after our invention has been incorporated in the control system and the time constant of the generator fields has been decreased. It may be seen that the total time for reversing is reduced by a value $t_5 - t_4$ while the maximum braking current peak has been reduced to a safe commutating value.

A better understanding of our invention may be had by a more detailed description of the operation of a system in which it is illustrated and used.

Referring particularly to Fig. 1 if an operator wishes to run the machine he actuates the motor starter S which applies energy to the motors P and P'. The generator G, regulator-generator R and the exciter E are thus caused to operate. The low voltage release relay 1 picks up and closes its contact member 2. When the exciter is up to full speed its voltage will be up to full value and the platen motor M may be started.

Since the exciter E is up to normal speed a predetermined potential exists across the buses 3 and 8. The coil 4 of relay 5 becomes energized through a circuit extending from bus 3 through contact member 6 of the time delay relay 7, the coil 4 of relay 5, to the bus 8. Closure of the contact member 9 of the relay 5 connects the generator residual-killing field 10 across the armature 11 of the generator G and thereby prevents the motor M from creeping while the machine is standing idle.

To begin operation of the machine, say, in the cut direction, the cut push button 12 is actuated thereby causing the control relay to operate. The circuit for this relay may be traced from bus 3 through contact members 2 of low voltage release relay 1, the stop switch 13, coil 14 of time limit relay 7, conductor 15, the back contact members 16 of the automatic return switch 16, the make contacts 17 of automatic cut switch 12, coil 18 of control relay 19 to bus 8.

Operation of control relay 19 closes a holding circuit for coil 8 through contact members 20, and an energizing circuit is established for the automatic cut directional contactor 25. The circuit for this contactor may be traced from conductor 15, through the back contacts of switch 16, contact members 21 of relay 19, contact members 22 of automatic return directional contactor 23, coil 24 of automatic cut directional contact 25, limit switch 26 to bus 8.

During this stage of operation the relay 7 picks up thus deenergizing the braking control relay 5, thereby opening the circuit at contacts 9 to thus remove the generator differential field 10 from across the armature of generator G. Since relay 7 is a slow release type relay its contact members 6 will remain open during the short interval that both contactors 23 and 25 are deenergized thereby keeping the braking control relay 5 deenergized during the reversing cycle of the planer motor M.

Closing of the contact members 27 and 28 of the contactor 25 applies voltage to the generator fields 29 and 30 and the regulator generator fields 31 and 32, causing the motor M to operate the planer platen 33 in the cut direction. As the planer platen brings tool 34 near the end of the cut stroke on the work piece 35, a dog 36 on the planer platen 33 actuates a cut slow-down limit switch 37. A circuit is thus completed to energize the coil 38 of relay 39 which relay shunts the motor rheostat 40 from the circuit of the motor field 41 causing the motor M to slow down.

A short time later the dog 42 on the planer platen 33 actuates the cut limit switch 26. Actuation of the limit switch 26 opens the circuit for the coil 24 of contactor 25 thus removing energy from the generator fields 29 and 30 and the regulator generator fields 31 and 32. The coil 43 of the relay 44 is also deenergized but the contact member 45 does not open since the coil 43 is across the armature 46 of the motor M and the potential thereacross is still high enough to enable coil 43 to hold the armature 48 up against the tension of the spring 49. Collapse of the field current in the generator G causes a current to be induced in the generator differential field 10 which is being dampened by the resistor 51 since the contact member 45 is still closed. The damping effect of the generator differential field 10 limits the braking peak current to a safe commutation value. When the braking current has decreased to a predetermined value, the coil 43 is no longer able to hold armature 48 up and the contact member 45 opens removing the resistor 51 from the generator differential field circuit. Removal of the damping effect causes another peak of braking current to further decrease the deceleration time of the motor M.

Overtravel of the dog 42 past the limit switch 26 keeps the coil 43, and thus the relay 44, deenergized. The motor M thus comes to rest and reverses, by virtue of the operation of directional contactor 23. At this stage, the generator differential field 10 has no damping effect and the motor rapidly accelerates the platen 33 in the return direction. As the dog 42 travels in the return direction, it resets the cut limit switch 26 to its original position thereby closing the contact members 52 so as to again energize coil 53 of the relay 44. The potential across the motor M is by this time up to full value so that the additive effect of coils 43 and 53 on the armature 48 causes it to pick up and close contact member 45 thereby damping the generator differential field 10. The changes in current and flux in the generator fields 29 and 30 during normal operation while running at constant speed are relatively small so that the dampened generator differential field has little if any noticeable effect on the operation of the system.

The sequence of operation at the end of the return stroke is like the sequence of operation already explained for the end of the cut stroke.

We use the variable-voltage generator differential or residual killing field as a damping winding by connecting it in series with an adjustable resistor. The damping effect can be controlled by varying the resistance of this resistor. To control the time of application we use a double coil relay having an adjustable spring-biased armature. The make contacts of this relay connect the resistor and the generator differential field in series. The tension of the spring member, providing the bias to the relay armature, is adjustable so that the relay may be set to open its contacts at the proper time.

By proper selection of electrical characteristics of a generator differential field, a resistor and a relay incorporated with a conventional variable-voltage control system, we are able to obtain the fastest possible reversing time consistent with good commutation.

We are aware, of course, that others, after having the benefits of the teachings of our invention, may devise other circuit diagrams for accomplishing the novel results we have herein disclosed, but we do not wish to be limited to the particular embodiment of our invention herein disclosed, but wish to be limited only by the scope of the claims hereto appended, and by such prior art as may be pertinent.

We claim as our invention:

1. In a system of control for controlling the speed of reversal of a planer platen, in combination, a reciprocating planer platen, a direct current motor for reciprocating the platen, a direct current generator having its armature connected directly in series with the platen motor armature, a differential field winding for the generator including in its circuit a resistor and a switching means, said switching means being adapted to automatically affect the characteristics of the generator differential field during the reversing cycle of the platen motor.

2. In a system of control for controlling the speed of operation of a planer platen, in combination, a reciprocating planer platen, a direct current motor for reciprocating the planer platen, a direct current generator having its armature connected serially with the motor armature, a differential field winding for the generator serially connected to an adjustable resistor through contacts of an electromagnetic switch, said electromagnetic switch being adapted to automatically affect the characteristics of the generator differential field during the reversing cycle of the platen motor.

3. In a system of control for controlling the speed of operation of a planer platen during its reversing cycle, in combination, a planer platen, a direct current motor for reciprocating the planer platen, a direct current generator having its armature connected serially with the planer platen motor armature, a differential field winding for the generator serially connected to an adjustable resistor through contacts of an electromagnetic switch, said electromagnetic switch having an armature with an adjustable air gap for varying its drop-out setting of said switch thereby effecting a change in the differential field winding characteristics during the reversing cycle of the platen motor.

4. In a system of control for controlling the speed of operation of a planer platen, during its reversing cycle, in combination, a planer platen, a direct current motor for reciprocating the planer platen, a direct current generator having its armature serially connected to the planer platen motor armature, a differential field winding for the generator serially connected to an adjustable resistor through control means of an electromagnetic switch, said electromagnetic switch having a spring-biased armature, said spring being adjustable for varying the drop-out voltage value of said armature thereby effecting a change in the generator differential field characteristics during the reversing cycle of the platen motor so as to obtain close commutation control.

5. In a control system for controlling speed of the reversing operation of a planer platen, in combination, a planer platen, a direct current motor for reciprocating the planer platen, a direct current generator having its armature serially connected to the planer platen motor armature, a differential field winding for the generator serially connected to an adjustable resistor through contact members of an electromagnetic switch, said electromagentic switch having coils that are additive, one coil being energized through the reversing switches with full line voltage and another connected across generator armature and energized by the potential thereacross.

6. In a system of control, for controlling the operation of a machine tool, in combination, a machine tool adapted to operate on a work piece, a direct current motor for operating the machine tool, a direct current generator having its armature connected in series with the motor armature, a differential field winding for the generator including in its circuit an adjustable resistor and contact means, said contact means being electromagnetically operated by any adjustable spring-biased armature which is energized by a plurality of coils, one coil being energized by a constant voltage source and another coil being energized by the potential across the motor-generator circuit, said coils being additive and the variable voltage coil being designed to hold the said relay armature, and thus the contact members, in a closed position without the aid of the constant voltage coil during only a portion of the braking period in the reversing cycle of the machine motor, thus effecting a change in the generator differential field characteristics during the latter portion of the braking period so as to insure good commutation throughout the reversing cycle of the machine tool motor.

GEORGE E. KING.
WILLIAM H. FORMHALS.